United States Patent
Uno

(10) Patent No.: US 9,714,147 B2
(45) Date of Patent: Jul. 25, 2017

(54) SHEET PROCESSING APPARATUS AND METHOD OF DETECTING THICKNESS OF SHEET

(71) Applicant: Kabushiki Kaisha Toshiba, Tokyo (JP)

(72) Inventor: Teruhiko Uno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/061,561

(22) Filed: Mar. 4, 2016

(65) Prior Publication Data

US 2017/0073179 A1    Mar. 16, 2017

(30) Foreign Application Priority Data

Sep. 10, 2015    (JP) .................................. 2015-178522

(51) Int. Cl.
| | | |
|---|---|---|
| *B65H 7/02* | (2006.01) | |
| *B65H 7/12* | (2006.01) | |
| *B65H 7/20* | (2006.01) | |
| *G01B 7/06* | (2006.01) | |

(52) U.S. Cl.
CPC ............... *B65H 7/125* (2013.01); *B65H 7/02* (2013.01); *B65H 7/20* (2013.01); *G01B 7/107* (2013.01); *B65H 2511/13* (2013.01)

(58) Field of Classification Search
CPC ............. G01B 7/087; B65H 7/02; B65H 7/20
See application file for complete search history.

(56) References Cited

U.S. PATENT DOCUMENTS

| | | | |
|---|---|---|---|
| 3,997,835 A | 12/1976 | Ando et al. | |
| 4,030,027 A | 6/1977 | Yamada et al. | |
| 5,321,366 A * | 6/1994 | Noboru ................ | G01D 5/2405 324/663 |
| 7,323,867 B2 | 1/2008 | Ueoka | |
| 2009/0057995 A1 | 3/2009 | Murakami et al. | |
| 2010/0322689 A1 | 12/2010 | Ohtani et al. | |
| 2014/0284864 A1 | 9/2014 | Miyashita | |

FOREIGN PATENT DOCUMENTS

| | | |
|---|---|---|
| GB | 1485514 A | 9/1977 |
| GB | 2054867 A | 2/1981 |
| JP | 2009-192385 A | 8/2009 |
| JP | 2012242736 A | 12/2012 |
| RU | 2536636 C2 | 12/2014 |

* cited by examiner

*Primary Examiner* — Howard Sanders
(74) *Attorney, Agent, or Firm* — Baker Botts L.L.P.

(57) ABSTRACT

A sheet processing apparatus, comprising a thickness detecting device, the thickness detecting device including:
a plurality of conductive displacement members;
a plurality of resonance circuits that are disposed to correspond to the plurality of displacement members, each include a coil facing the corresponding displacement member and a capacitor, and neighboring resonance circuits resonate at different resonance frequencies; and
a calculator that calculates a thickness of the sheet based on impedance values of the plurality of resonance circuits and the plurality of displacement members.

16 Claims, 11 Drawing Sheets

ND METHOD OF DETECTING THICKNESS OF
SHEET PROCESSING APPARATUS AND METHOD OF DETECTING THICKNESS OF SHEET

CROSS-REFERENCE TO RELATED APPLICATIONS

This application is based upon and claims the benefit of priority from the prior Japanese Patent Applications No. 2015-178522 filed on Sep. 10, 2015, the entire contents of which are incorporated herein by reference.

FIELD

Embodiments of the present invention relate to a sheet processing apparatus and a method of detecting a thickness of a sheet.

BACKGROUND

In the related art, a paper sheet processing apparatus is known which sorts paper sheets such as bills based on a type or a damage level thereof.

When a paper sheet is torn and a reinforcing material such as a tape is pasted on the paper sheet, the thickness of the paper sheet in the part on which the reinforcing material is pasted is different from the thickness on the other parts. Accordingly, the paper sheet processing apparatus detects a damage level of a paper sheet by detecting the thickness of the paper sheet.

A thickness detecting device is known as a device that detects a thickness of a paper sheet.

The thickness detecting device presses a conductive measuring target of metal or the like on a paper sheet and detects the thickness of the paper sheet based on a distance to the measuring target which varies depending on the thickness of the paper sheet.

The thickness detecting device includes, for example, a noncontact displacement sensor having a coil and an oscillation circuit. The thickness detecting device detects the distance between the coil and the measuring target by detecting a variation in oscillation frequency or inductance of the oscillation circuit which varies depending on the distance between the coil and the measuring target.

In the thickness detecting device according to the related art, when a plurality of planar coil patterns are arranged closely on a planar board to detect a thickness of the entire surface of a paper sheet, the oscillation circuits may interfere with each other due to a pull-in phenomenon or a coupling phenomenon and thus may not detect the thickness of the paper sheet with high accuracy.

DETAILED DESCRIPTION

Hereinafter, a sheet processing apparatus and a method of detecting a thickness of a sheet of an embodiment will be described with reference to the accompanying drawings.

Figure 1:
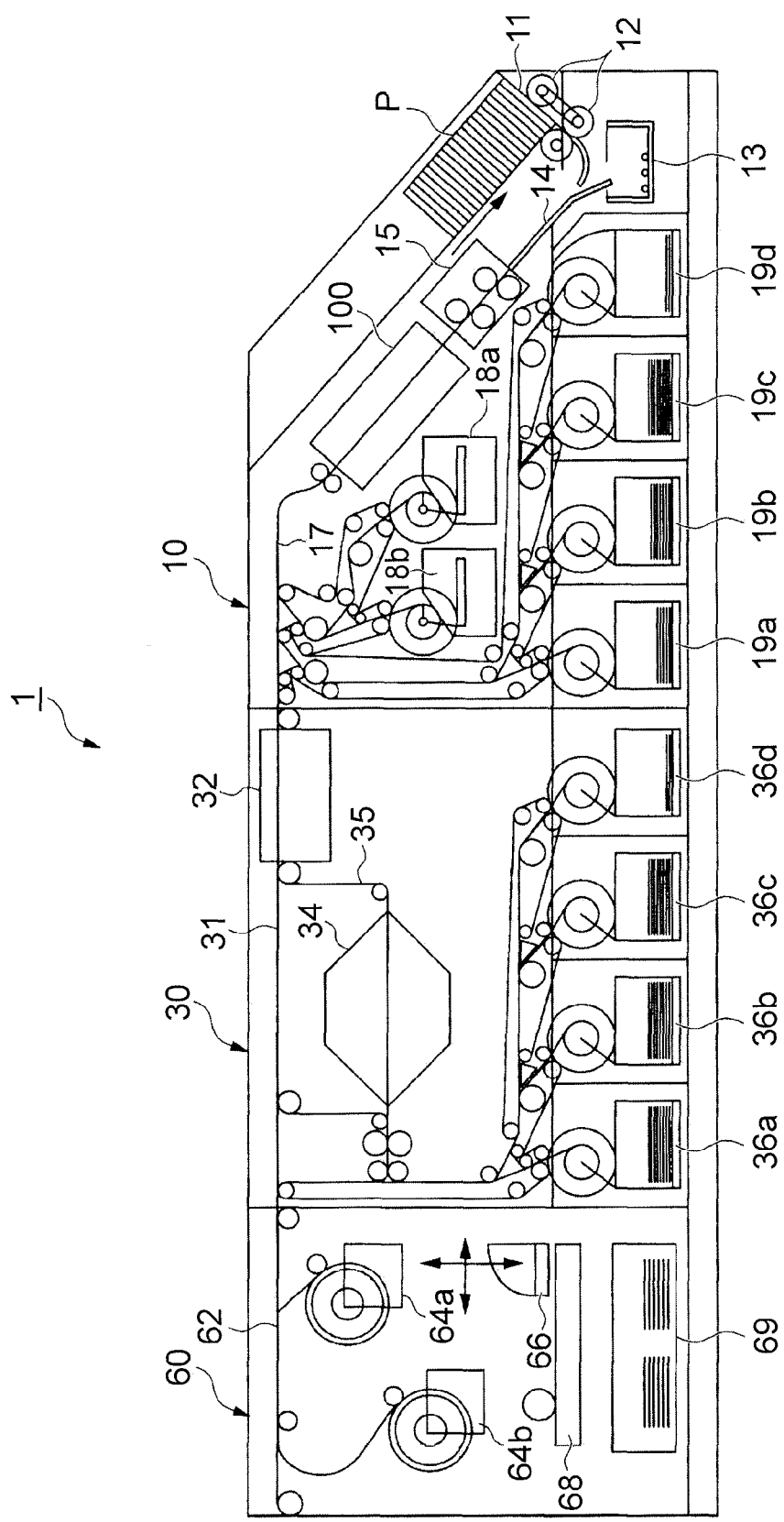
FIG. 1 is a diagram schematically illustrating the entire configuration of a paper sheet processing apparatus 1 according to an embodiment.

FIG. 1 is a diagram schematically illustrating the entire configuration of a paper sheet processing apparatus 1 according to an embodiment. The paper sheet processing apparatus 1 includes, for example, a main module 10, an arranging module 30, and a sealing module 60. The main module 10, the arranging module 30, and the sealing module 60 are arranged in a line in this order. The main module 10, the arranging module 30, and the sealing module 60 are electrically and mechanically connected to each other. Paper sheets P to be processed by the paper sheet processing apparatus 1 are, for example, bills, but the paper sheet processing apparatus 1 may process paper sheets P other than bills, such as mails, various cards, or various tickets.

A process of distributing paper sheets P will be first described. As illustrated in FIG. 1, the main module 10 includes a feed unit 11, a roller 12, a conveyance path 14, a conveyance unit 15, a conveyance path 17, rejection units 18a and 18b, accumulation storages 19a, 19b, 19c, and 19d. A plurality of paper sheets P are placed on the feed unit 11. The roller 12 sends out the paper sheets P from the feed unit 11 sheet by sheet. The conveyance path 14 conveys the paper sheet P sent out by the roller 12. In the conveyance path 14, a plurality of sets of endless conveyance belts (not illustrated) are disposed to extend with the conveyance path interposed therebetween. The paper sheet P sent out by the roller 12 is clamped and conveyed by the conveyance belts.

The conveyance path 14 extends inclined toward a determination processing unit 100 from a position next to the roller 12. Accordingly, when a foreign matter such as a clip, a coin, or a pin along with the paper sheet P is sent out from the feed unit 11 to the conveyance path 14, the foreign matter drops onto the lowest portion of the conveyance path 14 due to its own gravity. As a result, it is possible to prevent the foreign matter from entering the determination processing unit 100 and thus to prevent a damage of the determination processing unit 100 due to the foreign matter.

The lowest portion of the conveyance path 14 is provided with a foreign matter collecting unit 13. The foreign matter collecting unit 13 includes, for example, a collection box which can be drawn out of the apparatus body. The foreign matter dropping along the conveyance path 14 falls into the foreign matter collecting unit 13 and is collected.

The conveyance unit 15 adjusts a conveyance speed of a paper sheet P such that a gap between a paper sheet P and a paper sheet P to be conveyed is equal to a predetermined gap, and conveys the paper sheet P to the determination processing unit 100. The determination processing unit 100 detects a type (kind) of the paper sheet P or abnormality of the paper sheet P (forming such as pasting of a reinforcing material, a tear, a fold, contamination, two-sheet taking out (double feed), or the like). Specifically, the determination processing unit 100 determines pasting of a reinforcing material, a tear, a fold, two-sheet taking out, or the like of the paper sheet P by detecting the thickness of the paper sheet P using a thickness detecting unit 200 to be described later.

The determination processing unit 100 detects an image of the conveyed paper sheet P. The image of the paper sheet P includes a transmission image and a reflection image. The determination processing unit 100 detects excitation light emitted from a light-emitting substance printed on the paper sheet P using an excitation light detecting device. The determination processing unit 100 detects magnetism emitted from a magnetic substance included in the paper sheet P. The determination processing unit 100 determines at least one of a type, authenticity (truth/false), a damage level, and the like of the paper sheet P based on the detected image, the detected excitation light, and the detected magnetism. The determination processing unit 100 detects directions of front and back sides of the paper sheet P based on the detected image.

When abnormality of a paper sheet P is detected, the main module 10 conveys the paper sheet P along a conveyance path 17 and sorts and accumulates the paper sheet P in the rejection unit 18a or 18b based on the abnormality type. On the other hand, when abnormality of the paper sheet P is not detected, the main module 10 conveys the paper sheet P along the conveyance path 17 and sorts and accumulates the paper sheet P in any one of the accumulation storages 19a, 19b, 19c, and 19d based on the type of the paper sheet P. A process of distributing paper sheets P has been described until now.

A process of arranging paper sheets P will be described below. The arranging process is a process of aligning positions and adjusting front and back sides of paper sheets P and collecting the paper sheets for each type. The arranging module 30 disposed between the main module 10 and the sealing module 60 includes conveyance paths 31 and 35, an arranging unit 32, an inversion unit 34, a plurality of accumulation storages 36a, 36b, 36c, and 36d.

The conveyance path 31 conveys a paper sheet P sent from the main module 10. The arranging unit 32 arranges paper sheets P. The arranging unit 32 matches the center of a paper sheet P sent from the main module 10 with a predetermined reference position in the direction crossing the conveying direction of the paper sheet P. The arranging unit 32 corrects the direction of the paper sheet P such that the front of a skewing paper sheet P crosses the conveying direction. The skewing means that the conveying direction and a side of paper sheet P do not cross nor parallel, but have an angle each other.

The inversion unit 34 is disposed downstream in the conveying direction from the arranging unit 32 and inverts the front and back sides of the paper sheet P. The conveyance path 35 conveys the paper sheet P to the inversion unit 34. In performing the process of arranging paper sheets P, it is necessary to make same the front and back sides of each paper sheet P. Accordingly, the determination processing unit 100 reads an image of the paper sheet P, detects the front and back sides of the paper sheet P, and transmits the detection result to the arranging module 30. The arranging module 30 switches an operation of inverting the front and back sides of the paper sheet P using the inversion unit 34 based on the detection result of the front and back sides from the determination processing unit 100.

When the front and back sides of the paper sheet P are not inverted, the arranging module 30 conveys the paper sheet P along the conveyance path 31 and sorts and accumulates the paper sheet in the accumulation storage 36a, 36b, 36c, or 36d based on the type of the paper sheet P. On the other hand, when the front and back sides of the paper sheet P are to be inverted, the arranging module 30 conveys the paper sheet P along the conveyance path 35. The inversion unit 34 includes a twisting conveyance path therein and inverts the front and back sides of the paper sheet P while conveying the paper sheet P. Thereafter, the arranging module 30 conveys the paper sheet P of which the front and back sides are inverted by the inversion unit 34 and sorts and accumulates the paper sheet P in the accumulation storage 36a, 36b, 36c, or 36d based on the type of the paper sheet P. The process of arranging a paper sheet P has been described until now.

The arranging module 30 may return the paper sheet P of which the direction is adjusted to the main module 10 and may sort and accumulate the paper sheet P in the accumulation storage 19a, 19b, 19c, or 19d. The accumulation storages 36a, 36b, 36c, and 36d in the arranging module 30 may be used as rejection units in which a paper sheet P of which the abnormality is detected is accumulated.

A process of sealing a paper sheet P will be described below. The sealing process is a process of sealing a bundle of 100 paper sheets P with a band. In the embodiment, the paper sheets P are processed by a predetermined number of sheets such as 100 sheets, but the embodiment is not limited to this example. The sealing module 60 includes a conveyance path 62, a first accumulation unit 64a, a second accumulation unit 64b, a conveyance tray 66, and a sealing unit 68. The conveyance path 62 is connected to the conveyance path 31 of the arranging module 30. The first accumulation unit 64a and the second accumulation unit 64b accumulate the paper sheets P by 100 sheets. The conveyance tray 66 conveys a bundle of 100 paper sheets P. The sealing unit 68 seals the bundle of 100 paper sheets P with a band. The second accumulation unit 64b is disposed separated obliquely downward from the first accumulation unit 64a and the sealing unit 68 is disposed below the second accumulation unit 64b. A discharge unit 69 receiving and accumulating a bundle of 100 paper sheets P which is sealed by the sealing unit 68 is disposed below the sealing unit 68.

The sealing module 60 conveys the paper sheet P to any one of the first accumulation unit 64a and the second accumulation unit 64b, for example, based on the type of the paper sheet P conveyed from the arranging module 30. The first accumulation unit 64a and the second accumulation unit 64b accumulate the conveyed paper sheets P by 100 sheets.

The conveyance tray 66 is disposed to be movable in the arrow directions in FIG. 1. When a predetermined number of paper sheets P are accumulated in the first accumulation unit 64a, the conveyance tray 66 moves to the position of the first accumulation unit 64a and receives a bundle of 100 paper sheets P. When a predetermined number of paper sheets P are accumulated in the second accumulation unit 64b, the conveyance tray 66 moves to the position of the second accumulation unit 64b and receives a bundle of 100 paper sheets P.

After receiving a bundle of 100 paper sheets P, the conveyance tray 66 moves down to the position of the sealing unit 68 and hands over the bundle of 100 paper sheets P to the sealing unit 68. The sealing unit 68 winds a band on the bundle of 100 paper sheets P received from the conveyance tray 66. The sealing unit 68 prints predetermined information on the band of the bundle of 100 paper sheets P. Examples of the information printed on the band include a date and time, a serial number, and a bank logo. Such information is printed, for example, using an ink jet printer, a dot printer, or a laser printer.

After the information is completely printed on the band, the sealing unit 68 discharges the bundle of 100 paper sheets P to the discharge unit 69. The sealing unit 68 changes the position based on the type of the paper sheets P and discharges the bundle of 100 paper sheets P. The process of sealing paper sheets P has been described until now.

Figure 2:
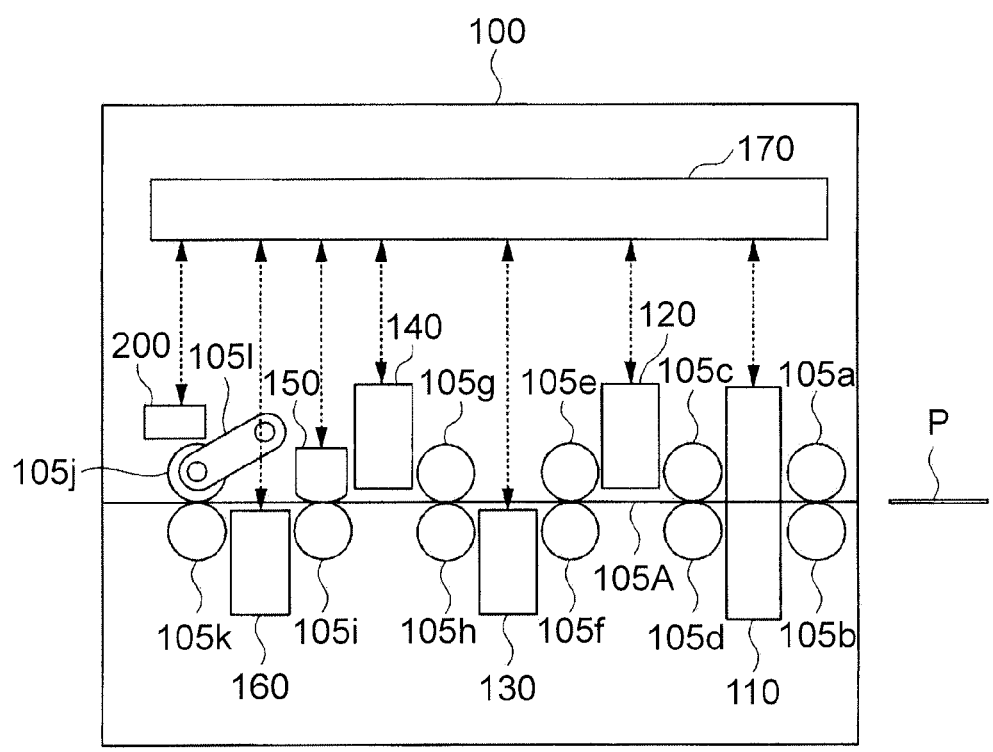
FIG. 2 is a diagram schematically illustrating a configuration of a determination processing unit 100 according to the embodiment.

The determination processing unit 100 will be described below. FIG. 2 is a diagram schematically illustrating the configuration of the determination processing unit 100 according to the embodiment. The determination processing unit 100 includes a plurality of conveyance rollers 105a, 105b, 105c, 105d, 105e, 105f, 105g, 105h, 105i, 105j, and 105k. The determination processing unit 100 supplies a drive torque to the conveyance rollers from motors (not illustrated) to rotationally drive the conveyance rollers. Accordingly, in the determination processing unit 100, a paper sheet P is conveyed along the conveyance path 105A from right to left in the drawing at a predetermined conveyance speed. In this embodiment, a paper sheet P is conveyed in a state in which the top surface faces the upper side in the drawing and the bottom surface faces the lower side in the drawing.

The determination processing unit 100 includes, for example, a transmission image detecting unit 110, a top-surface reflection image detecting unit 120, a bottom-surface reflection image detecting unit 130, a top-surface excitation light detecting unit 140, a magnetism detecting unit 150, a bottom-surface excitation light detecting unit 160, a thickness detecting unit (thickness detecting device) 200, and a detection information processing unit 170.

The transmission image detecting unit 110 detects a transmission image of a paper sheet P. The transmission image detecting unit 110 includes, for example, a light source disposed above the paper sheet P and an image sensor disposed below the paper sheet P. The transmission image detecting unit 110 causes the light source to irradiate a paper sheet P with light at a timing at which the paper sheet P is conveyed and detects light transmitted by the paper sheet P by the image sensor. Accordingly, the transmission image detecting unit 110 generates a transmission image signal using the image sensor. The transmission image detecting unit 110 supplies the generated transmission image signal to the detection information processing unit 170.

The top-surface reflection image detecting unit 120 detects a reflection image of the top surface of the paper sheet P. The top-surface reflection image detecting unit 120 includes, for example, a light-emitting unit and a light-receiving unit which are disposed above the paper sheet P. The light-emitting unit is, for example, an LED array in which a plurality of light emitting diodes (LEDs) are arranged in a line. The LED emits visible light or near-infrared light. The light-receiving unit is a photodiode array in which photodiodes are arranged to correspond to the LED array or a one-dimensional image reading sensor including a charge coupled device (CCD).

The top-surface reflection image detecting unit 120 causes the light-emitting unit to irradiate the paper sheet P with light at a timing at which the paper sheet P is conveyed and causes the light-receiving unit to detect reflected light from the top surface of the paper sheet P. The top-surface reflection image detecting unit 120 generates a top-surface reflection image signal for every predetermined width in the conveying direction. The top-surface reflection image detecting unit 120 supplies the generated top-surface reflection image signal to the detection information processing unit 170.

The bottom-surface reflection image detecting unit 130 detects a reflection image of the bottom surface of the paper sheet P. The bottom-surface reflection image detecting unit 130 includes, for example, a light-emitting unit and a light-receiving unit which are disposed below the paper sheet P. The light-emitting unit and the light-receiving unit have the same configurations as in the top-surface reflection image detecting unit 120. The bottom-surface reflection image detecting unit 130 causes the light-emitting unit to irradiate the paper sheet P with light at a timing at which the paper sheet P is conveyed and causes the light-receiving unit to detect reflected light from the bottom surface of the paper sheet P. The bottom-surface reflection image detecting unit 130 generates a bottom-surface reflection image signal for every predetermined width in the conveying direction. The bottom-surface reflection image detecting unit 130 supplies the generated bottom-surface reflection image signal to the detection information processing unit 170.

The top-surface excitation light detecting unit 140 detects excitation light of the top surface of the paper sheet P. The excitation light detected by the top-surface excitation light detecting unit 140 includes fluorescence and phosphorescence. The top-surface excitation light detecting unit 140 supplies a top-surface fluorescence signal indicating the fluorescence detected from the top surface of the paper sheet P to the detection information processing unit 170. The top-surface excitation light detecting unit 140 supplies a top-surface phosphorescence signal indicating the phosphorescence detected from the top surface of the paper sheet P to the detection information processing unit 170.

The magnetism detecting unit 150 detects magnetic characteristics of the paper sheet P. An example of the magnetic characteristics is an amount of a magnetic substance included in the paper sheet P. The magnetism detecting unit 150 is, for example, a magnetic head. The magnetic head has a configuration in which a primary coil and a secondary coil are wound on a core (iron core) in reverse directions. The magnetic head supplies a DC bias current to the primary coil and detects a variation in magnetic flux when the magnetic substance included in the paper sheet P passes therethrough using the secondary coil. Accordingly, the magnetic head generates a magnetic signal which varies depending on the amount of the magnetic substance in the paper sheet P. The magnetism detecting unit 150 supplies the generated magnetic signal to the detection information processing unit 170.

The bottom-surface excitation light detecting unit 160 detects excitation light of the bottom surface of the paper sheet P. The excitation light detected by the bottom-surface excitation light detecting unit 160 includes fluorescence and phosphorescence. The bottom-surface excitation light detecting unit 160 supplies bottom-surface fluorescence signal indicating the fluorescence detected from the bottom surface of the paper sheet P to the detection information processing unit 170. The bottom-surface excitation light detecting unit 160 supplies a bottom-surface phosphorescence signal indicating the phosphorescence detected from the bottom surface of the paper sheet P to the detection information processing unit 170.

The thickness detecting unit 200 detects the thickness of the paper sheet P. In the thickness detecting unit 200, the shaft of the conveyance roller 105j is connected to an arm 105l of which one arm end is fixed to another rotation shaft. The conveyance roller 105j moves in a direction separated from the conveyance roller 105k depending on the thickness of the conveyed paper sheet P. The thickness detecting unit 200 detects the thickness of the paper sheet P by detecting a displacement amount of the conveyance roller 105j. The thickness detecting unit 200 supplies a thickness detection signal indicating the thickness of the paper sheet P for every predetermined width in the conveying direction to the detection information processing unit 170.

The detection information processing unit 170 is connected to the transmission image detecting unit 110, the top-surface reflection image detecting unit 120, the bottom-surface reflection image detecting unit 130, the top-surface excitation light detecting unit 140, the magnetism detecting unit 150, the bottom-surface excitation light detecting unit 160, and the thickness detecting unit 200. Signals output from the detecting units are input to the detection information processing unit 170. The detection information processing unit 170 performs an A/D conversion process on the output signals. The detection information processing unit 170 performs a process such as a correction process depending on the data subjected to the A/D conversion process and generates detection information. The detection information processing unit 170 determines a type, a direction, authenticity, or a contamination and a damage level, and the like of the paper sheet P based on the generated detection information.

Figure 3:
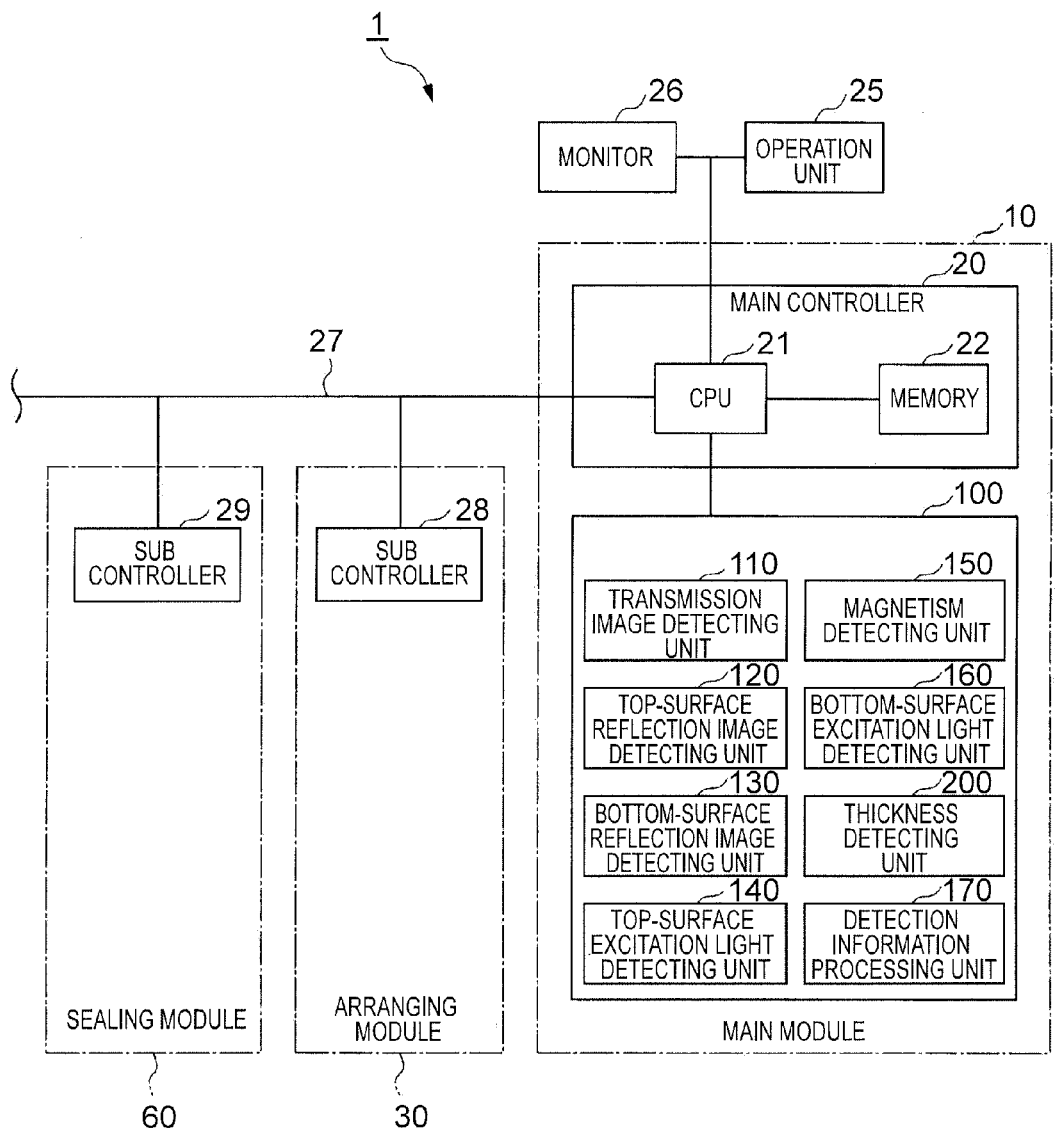
FIG. 3 is a block diagram illustrating the paper sheet processing apparatus 1 according to the embodiment.

FIG. 3 is a block diagram of the paper sheet processing apparatus 1 according to the embodiment. The main module 10 is provided with a main controller 20 that controls the operations of the paper sheet processing apparatus 1 as a whole. The main controller 20 includes a central processing unit (CPU) 21 that controls operations of the respective modules, and a memory 22 that stores a control program, management information, and the like.

The CPU 21 is connected to the determination processing unit 100 and transmits and receives a variety of information thereto and therefrom. Although not illustrated in the drawing, various sensors or motors in the main module 10 are connected to the CPU 21 and the CPU 21 controls the operations of conveying the paper sheet P in the main module 10.

The main controller 20 is connected to an operation unit 25 that is used for an operator to input a variety of information. The main controller 20 is connected to a monitor 26 that displays the information input by the operator, an operating state of the paper sheet processing apparatus 1, or the like.

The arranging module 30 includes a sub controller 28 that controls the operation of the arranging module 30. The sealing module 60 includes a sub controller 29 that controls the operation of the sealing module 60. The sub controller and the sub controller 29 are connected to the main controller 20 of the main module 10 via a local area network (LAN) cable 27. The CPU 21 transmits an operation instruction of the arranging module 30 to the sub controller and transmits an operation instruction for the sealing module 60 to the sub controller 29.

Figure 4:
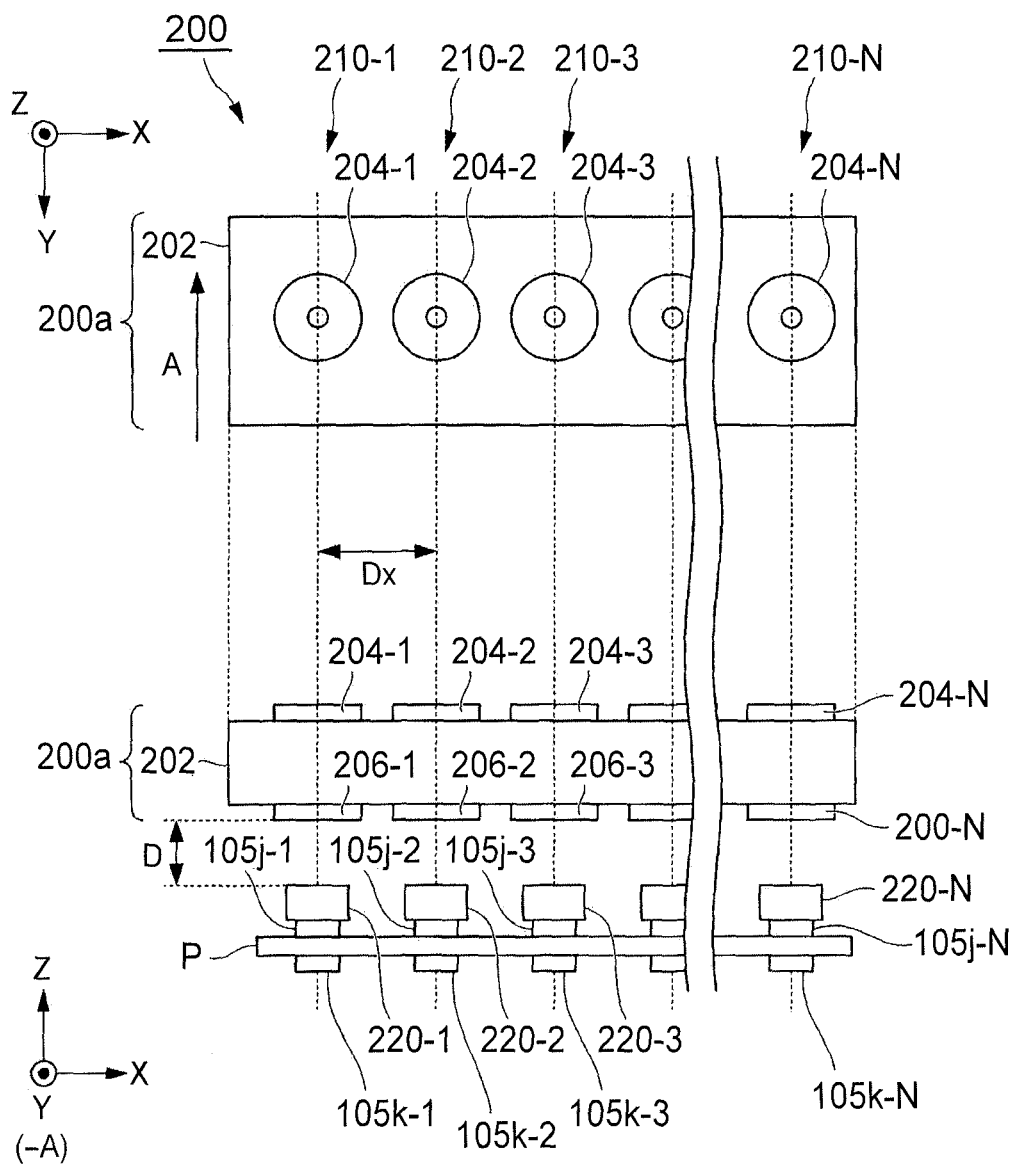
FIG. 4 is a diagram of a thickness detecting unit 200 according to the embodiment when viewed from a Z-axis direction and a Y-axis direction.
Figure 5:
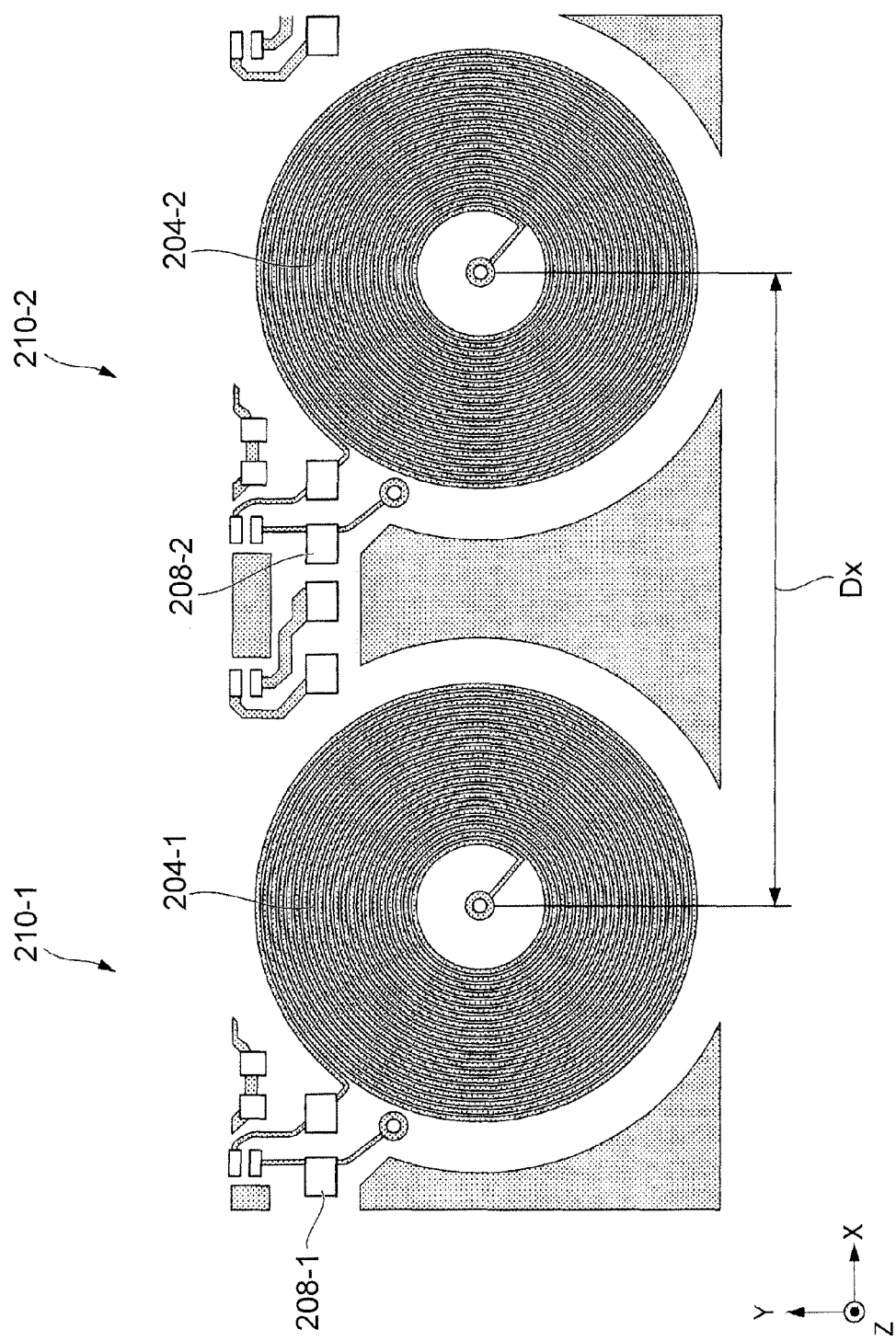
FIG. 5 is a diagram illustrating neighboring resonance circuits among a plurality of resonance circuits in the thickness detecting unit 200 according to the embodiment.
Figure 6:
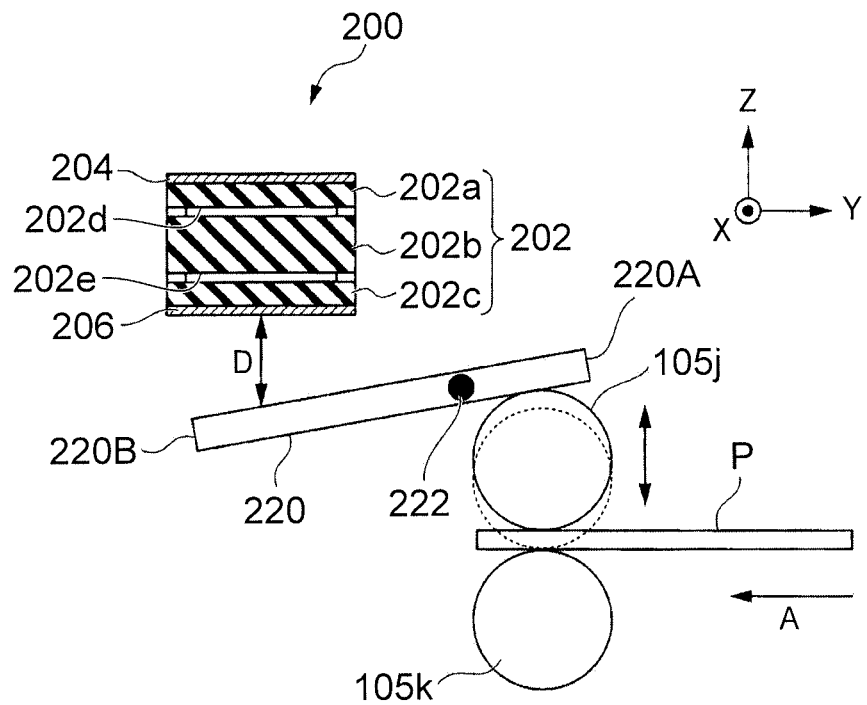
FIG. 6 is a diagram of the thickness detecting unit 200 according to the embodiment when viewed from an X-axis direction.

The thickness detecting unit 200 according to the embodiment will be described below. FIG. 4 is a diagram of the thickness detecting unit 200 according to the embodiment when viewed from a Z-axis direction and a Y-axis direction. FIG. 5 is a diagram illustrating neighboring resonance circuits among a plurality of resonance circuits in the thickness detecting unit 200 according to the embodiment. FIG. 6 is a diagram of the thickness detecting unit 200 according to the embodiment when viewed from an X-axis direction.

As illustrated in FIG. 4, the thickness detecting unit 200 includes, for example, a planar board 202, a resonance circuit group 200a including a plurality of resonance circuits 210-1, 210-2, 210-3, . . . , and 210-N that are formed in the planar board 202, and a plurality of displacement members 220-1, 220-2, 220-3, . . . , and 220-N. Here, N is an arbitrary natural number. In the following description, when the plurality of resonance circuits are not distinguished from each other, a hyphen and a numeral subsequent to the hyphen are not described. When the plurality of displacement members are not distinguished from each other, a hyphen and a numeral subsequent to the hyphen are not described.

The planar board 202 is disposed such that the side in the longitudinal direction crosses the conveying direction A of the paper sheet P. The plurality of resonance circuits 210 of which coil layers and capacitors to be described later are formed on the planar board 202 are arranged in a direction (X direction) crossing the conveying direction A of the paper sheet P. The direction crossing the conveying direction A of the paper sheet P is, for example, a direction perpendicular to the conveying direction A of the paper sheet P.

The plurality of displacement members 220 are disposed to face the plurality of resonance circuits 210 in the Z direction and are arranged in the direction crossing the conveying direction A of the paper sheet P. A plurality of pairs of conveyance rollers 105j and 105k are disposed on the −Z side of the plurality of displacement members 220. The plurality of pairs of conveyance rollers 105j and 105k are arranged in the direction crossing the conveying direction A of the paper sheet P. The embodiment describes an example in which N resonance circuits 210 and N displacement members 220 are arranged in the direction crossing the conveying direction A of the paper sheet P as indicated by numerals subsequent to the hyphens in the drawing, but the number of elements is not limited to the predetermined value. In the thickness detecting unit 200, the number of resonance circuits 210 and the number of displacement members 220 may be adjusted by adjusting the distance Dx of the thickness detecting unit 200 in the direction crossing the conveying direction A of the paper sheet P.

As illustrated in FIG. 6, the planar board 202 includes, for example, a first insulating layer 202a, a second insulating layer 202b, and a third insulating layer 202c. A first air layer 202d is formed between the first insulating layer 202a and the second insulating layer 202b. A second air layer 202e is formed between the second insulating layer 202b and the third insulating layer 202c.

As illustrated in FIG. 5, a first coil layer 204 and a capacitor 208 are formed on the surface of the first insulating layer 202a on the +Z side. A second coil layer 206 is formed on the surface of the third insulating layer 202c on the −Z side. The first coil layer 204 and the second coil layer 206 are formed by planar coil patterns. The plurality of capacitors 208 are connected to the plurality of first coil layers 204, respectively. FIG. 5 illustrates the resonance circuits 210-1 and 210-2 among the plurality of resonance circuits illustrated in FIG. 4.

The thickness (the distance in the Z direction) of the first coil layer 204 and the thickness of the second coil layer 206 are, for example, about 18 [μm]. The first coil layer 204 and the second coil layer 206 are circuit elements included in each resonance circuit 210. The first coil layer 204 and the second coil layer 206 are arranged in the direction crossing the conveying direction A of the paper sheet P to face the corresponding displacement member 220. The distance Dx between the centers of the neighboring first coil layers 204 among the plurality of first coil layers 204 is, for example, 15 mm or less and it is desirable that the distance be short to enhance a detection resolution in the direction crossing the conveying direction A of the paper sheet P.

The first insulating layer 202a, the second insulating layer 202b, and the third insulating layer 202c are formed of a material having a specific dielectric constant of 4.7. The thickness of the first insulating layer 202a is, for example, 200 [μm]. The thickness of the second insulating layer 202b is, for example, 1000 [μm]. The thickness of the third insulating layer 202c is, for example, 200 [μm]. The specific dielectric constants of the first air layer 202d and the second air layer 202e are both 1.0. The thickness of the first air layer 202d and the thickness of the second air layer 202e are, for example, 35 [μm]. The first air layer 202d and the second air layer 202e are disposed to increase inductance of the first coil layer 204 and the second coil layer 206. The above-described numerical values are only examples and may be increased or decreased at the same ratio for all of them.

As illustrated in FIG. 6, a pair of rollers including the conveyance roller 105j and the conveyance roller 105k in the determination processing unit 100 is disposed on the −Z side of each second coil layer 206. Springs (not illustrated) are attached to both ends of the shaft of the conveyance roller 105j, and a force in the direction from the conveyance roller 105j to the conveyance roller 105k (the −Z direction in FIG. 6) is applied by the springs. Accordingly, when a paper sheet P is not introduced between the pair of rollers, the conveyance roller 105j is in contact with or is positioned close to the conveyance roller 105k (the position indicated by the dotted line in FIG. 6). On the other hand, when a paper sheet P is introduced between the pair of rollers, the conveyance roller 105j moves in the direction in which it is separated away from the conveyance roller 105k (the +Z direction in FIG. 6) by the distance corresponding to the thickness of the paper sheet P.

Each displacement member 220 is, for example, a metal planar member. The displacement member 220 is shaft-supported by a shaft 222, and in the vicinity of one end 220A, comes in contact with the conveyance roller 105j at a side opposite to the side contacting the paper sheet P. Accordingly, when the conveyance roller 105j moves depending on the thickness of the paper sheet P, the displacement member 220 rotates about the shaft 222. When the displacement member 220 rotates, the distance D from the surface of the second coil layer 206 facing the displacement member 220 to the measurement position in the vicinity of the other end 220B of the displacement member 220 varies. The thickness detecting unit 200 can detect the thickness of the paper sheet P by detecting the distance D.

Figure 7:
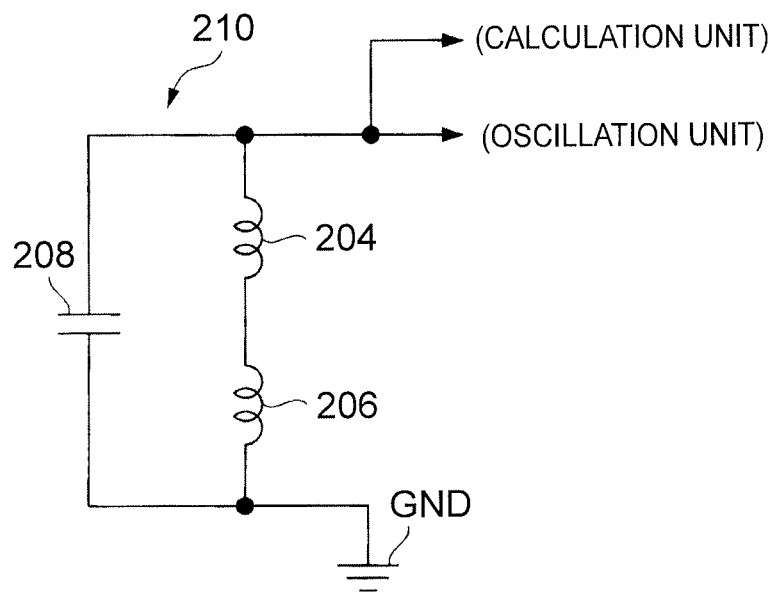
FIG. 7 is a circuit diagram of a resonance circuit 210 according to the embodiment.
Figure 8:
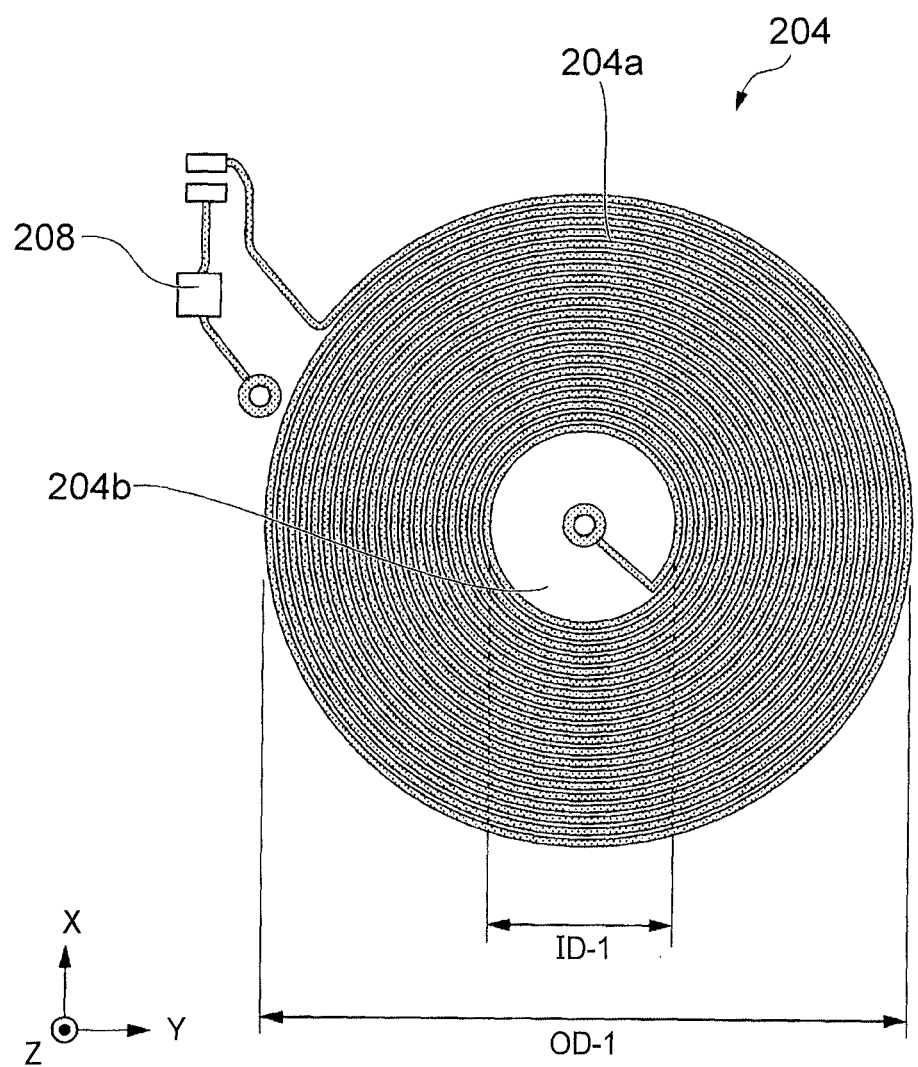
FIG. 8 is a diagram of a first coil layer 204 according to the embodiment when viewed from the Z-axis direction.
Figure 9:
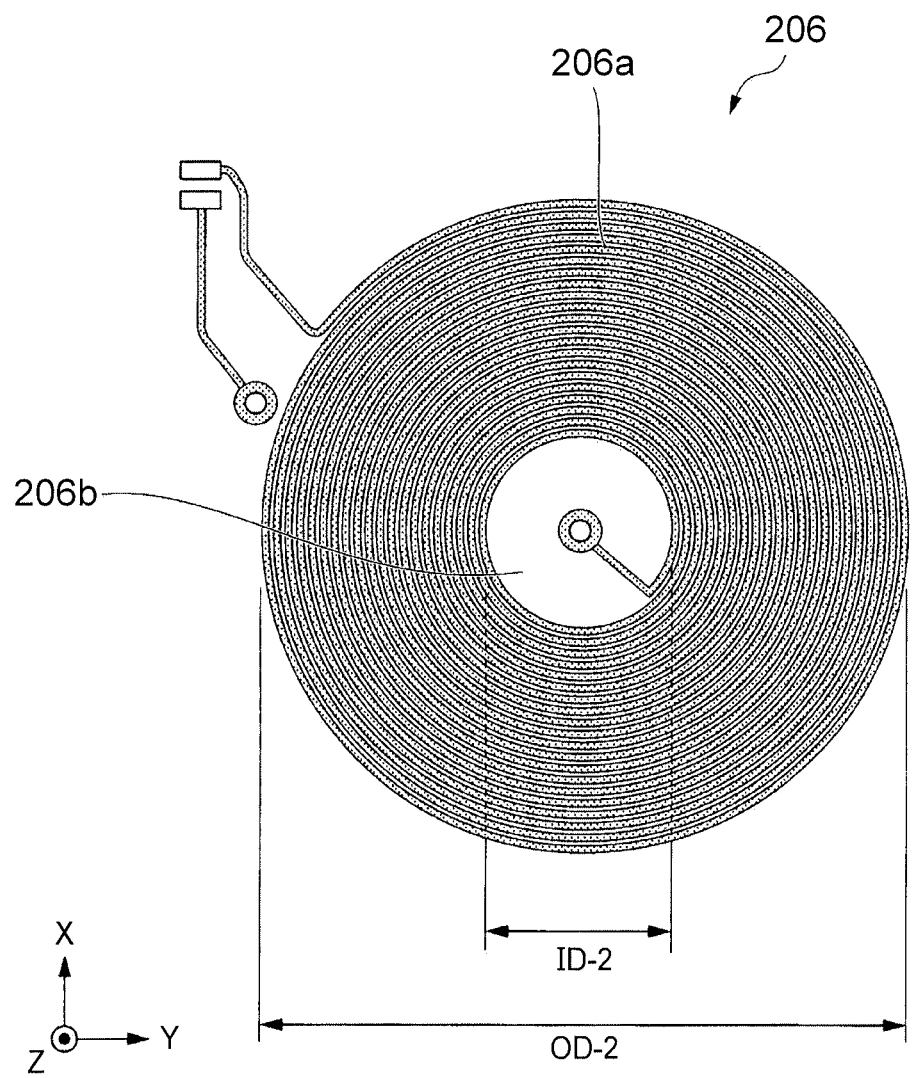
FIG. 9 is a diagram of a second coil layer 206 according to the embodiment when viewed from the Z-axis direction.

The specific configuration of each resonance circuit 210 will be described below. FIG. 7 is a circuit diagram of the resonance circuit 210 according to the embodiment. FIG. 8 is a diagram of the first coil layer 204 according to the embodiment when viewed from the Z-axis direction. FIG. 9 is a diagram of the second coil layer 206 according to the embodiment when viewed from the Z-axis direction.

As illustrated in FIG. 7, the first coil layer 204 and the second coil layer 206 are connected in series to each other. An end of the second coil layer 206 not connected to the first coil layer 204 is connected to a ground terminal GND. The capacitor 208 is connected in parallel to the first coil layer 204 and the second coil layer 206. In the resonance circuit 210, drive power (not illustrated) is supplied to both ends of the capacitor 208 and both ends of the first coil layer 204 and the second coil layer 206. In this way, the resonance circuit 210 is an LC parallel resonance circuit including the capacitor 208, the first coil layer 204, and the second coil layer 206. The coil connection illustrated in FIG. 7 is obtained by connecting the first coil layer 204 and the second coil layer 206 illustrated in FIG. 5 and FIGS. 8 to 9 in series to each other. The LC parallel resonance circuit illustrated in FIG. 7 is obtained by connecting the capacitor 208 illustrated in FIGS. 5 and 8 to the coil connection. The capacitor 208 may be disposed as a two-terminal element in a rectangular area indicated by 208 in FIGS. 5 and 8, or may be disposed between the rectangular area indicated by 208 and a conductor area in the vicinity thereof, or may be disposed between other conductor patterns.

In the resonance circuit 210, the impedance of the resonance circuit 210 can be decreased by shortening an electrical path connecting the first coil layer 204 and the second coil layer 206 to the capacitor 208. Accordingly, it is possible to decrease power for driving the resonance circuit 210 and thus to save power. It is also possible to suppress noise from the outside by shortening an electrical path connecting the resonance circuit 210 to an oscillation unit 230 to be described later.

As illustrated in FIG. 8, the first coil layer 204 includes a first coil 204a. The first coil 204a is a coil pattern constituting the first coil layer 204 formed in a planar shape. The coil pattern has, for example, a spiral shape. A first space 204b in which the coil pattern is not formed is present in the vicinity of the central axis of the first coil 204a. A difference between an outer diameter OD-1 and an inner diameter ID-1 of the first coil 204a can be decreased by disposing the first space 204b. As a result, it is possible to increase the inductance L of the first coil 204a. By increasing the inductance L, it is possible to increase the amplitude of the thickness detection signal and thus to enhance the detection accuracy of the thickness detecting unit 200. From experiment results, knowledge has been obtained that the inductance L of the first coil 204a can be increased by setting the ratio of the inner diameter ID-1 to the outer diameter OD-1 of the first coil 204a to 0.20 to 0.25.

As illustrated in FIG. 9, the second coil layer 206 includes a second coil 206a. The second coil 206a is a coil pattern constituting the second coil layer 206 formed in a planar shape. The coil pattern has, for example, a spiral shape. The second coil 206a is formed in the axial direction parallel (common) to the first coil 204a. A second space 206b in which the coil pattern is not formed is present in the vicinity of the central axis of the second coil 206a. The second coil 206a has the same configuration as the first coil 204a. In order to increase the inductance L of the second coil 206a, the ratio of the inner diameter ID-2 to the outer diameter OD-2 of the second coil 206a is also set to 0.20 to 0.25.

Here, when the average radius of the first coil 204a and the second coil 206a is defined as r, the number of turns of the first coil 204a and the second coil 206a is defined as N, and the difference between the outer diameter and the inner diameter of the first coil 204a and the second coil 206a is defined as d, the inductance L of the first coil 204a and the second coil 206a is calculated by the following Expression (1).

[Math. 1]

$$L = \frac{r^2 N^2}{(2r + 2.8d) \times 10^5} \quad \text{Expression (1)}$$

The first coil 204a is connected in series to the second coil 206a. The inductance L of the first coil 204a of the first coil layer 204 is, for example, equal (or close) to the inductance L of the second coil 206a of the second coil layer 206.

When the inductance of the first coil 204a and the second coil 206a is L, the number of turns of coils is defined as N and the distance between the first coil layer 204 and the second coil layer 206 is defined as x, the total inductance Ltotal of the first coil 204a and the second coil 206a is calculated by the following Expressions (2) and (3).

[Math. 2]

$$L_{total} = 2 \times L \times (1 + K_C) \quad \text{Expression (2)}$$

[Math. 3]

$$k_c = \frac{1.5625 \times N^2}{\left[\frac{(0.184x^3 - 0.525x^2 + 1.038x + 1.001)}{(1.67N^2 - 5.84N + 65)}\right]} \quad \text{Expression (3)}$$

In this way, even when the inductance of a single coil is small, the inductance can be increased by connecting the first coil layer 204 and the second coil layer 206 in series to each other. The inductance can be further increased by alternately disposing the insulating layer (202a, 202b, and 202c) and the air layer (202d and 202e) between the first coil layer 204 and the second coil layer 206. According to this embodiment, it is possible to enhance sensitivity for detecting the thickness of a paper sheet P by increasing the inductance of the coils disposed in the thickness detecting unit 200.

Suppression of interference between the neighboring resonance circuits among the plurality of resonance circuits in the thickness detecting unit 200 according to the embodiment will be described below. The thickness detecting unit 200 causes the neighboring resonance circuits 210 among the plurality of resonance circuits 210 on the planar board 202 to resonate at different resonance frequencies. Since the thickness detecting unit 200 causes the neighboring resonance circuits 210 among the plurality of resonance circuits 210 to resonate at different resonance frequencies, the capacitance of the capacitor 208 of one of the neighboring resonance circuits 210 among the plurality of resonance circuits 210 is different from the capacitance of the capacitor 208 of the other of the neighboring resonance circuits 210 among the plurality of resonance circuits 210.

The resonance frequency of each resonance circuit 210 is expressed by the following expression.

[Math. 4]

$$f(\text{Hz}) = \frac{1}{2\pi\sqrt{L \times C}} \quad \text{Expression (4)}$$

In Expression (4), f denotes a resonance frequency of the resonance circuit 210 and C denotes capacitance of the capacitor 208. L denotes the inductance of the first coil layer 204 and the second coil layer 206 and varies depending on the distance D between the second coil layer 206 and the displacement member 220. Specifically, L denotes the sum of mutual inductance LD of an eddy current flowing in the corresponding displacement member 220 and the total inductance Ltotal of the first coil 204a and the second coil 206a. (L=LD+Ltotal)

For example, when the capacitance values C of the capacitors 208 of the neighboring resonance circuits 210 among the plurality of resonance circuits 210 are equal to each other, the inductance values L and the capacitance values C of the capacitors 208 are hardly perfectly equal in the neighboring resonance circuits 210 among the plurality of resonance circuits 210. However, since the inductance L varies depending on the distance D between the second coil layer 206 and the displacement member 220, the resonance frequencies f may be equal in the neighboring resonance circuits 210 among the plurality of resonance circuits 210. When the resonance frequencies f are equal in the neighboring resonance circuits 210 among the plurality of resonance circuits 210, large noise may be superimposed on the thickness detection signal due to interference between the resonance circuits 210.

Accordingly, the neighboring resonance circuits 210 among the plurality of resonance circuits 210 are set to resonate at resonance frequencies f which are set with a difference larger than a variation width in resonance frequency f varying depending on the distance D between the displacement member 220 and the second coil layer 206. That is, the plurality of oscillation units 230 causes the neighboring resonance circuits 210 to resonate at the resonance frequencies f which are set with a difference larger than a variation width in resonance frequency f varying depending on the distance D between the displacement member 220 and the second coil layer 206. In the thickness detecting unit 200 according to the embodiment, for example, a difference is provided between the capacitance values of the capacitors 208 of the neighboring resonance circuits 210 among the plurality of resonance circuits 210 such that the resonance frequencies f of the neighboring resonance circuits 210 among the plurality of resonance circuits 210 are not equal nor extremely close to each other even when the inductance L varies depending on the distance D between the second coil layer 206 and the displacement member 220.

For example, when the inductance L is 10 μH, the capacitance values C of the capacitors 208 in three neighboring resonance circuits 210-1, 210-2, and 210-3 among the plurality of resonance circuits 210 are set to different values. For example, the capacitance C of the capacitor 208 in the resonance circuit 210-1 is set to 180 pF, the capacitance C of the capacitor 208 in the resonance circuit 210-2 is set to 270 pF, and the capacitance C of the capacitor 208 in the resonance circuit 210-3 is set to 390 pF. That is, the difference in the capacitance C between the capacitors 208 in the neighboring resonance circuits 210 among the plurality of resonance circuits 210 is set to 1.4 times to 1.5 times. In this case, the resonance frequency f of the resonance circuit 210-1 is 3.751 MHz, the resonance frequency f of the resonance circuit 210-2 is 3.063 MHz, and the resonance frequency f of the resonance circuit 210-3 is 2.549 MHz. In this way, the difference in the capacitance C is set between the capacitors 208 in the neighboring resonance circuits 210 among the plurality of resonance circuits 210 so as to increase the difference in the resonance frequency f between the neighboring resonance circuits 210 among the plurality of resonance circuits 210. It is desirable that the difference in the capacitance C between the capacitors 208 in the neighboring resonance circuits 210 among the plurality of resonance circuits 210 be equal to or greater than 1.5 times, more preferably, equal to or greater than 1.5 times, from the viewpoint of increasing the effect of preventing interference between the resonance circuits 210. The upper limit of the difference in the capacitance C between the capacitors 208 is set to the upper limit of the difference in the resonance frequency f which can be changed by changing the capacitance C of the capacitors 208 in the resonance circuits 210. Accordingly, the thickness detecting unit 200 can suppress matching of the resonance frequencies f between the neighboring resonance circuits 210 among the plurality of resonance circuits 210 and can suppress interference between the resonance circuits 210.

It is desirable that the difference in the capacitance C between the capacitors 208 in the neighboring resonance circuits 210 among the plurality of resonance circuits 210 be set based on the maximum variation width in the mutual inductance LD of the eddy currents flowing in the displacement members 220 in the thickness detecting unit 200. When the variation width in the mutual inductance LD of the eddy currents flowing in the displacement members 220 is the maximum, it is desirable that the difference in the capacitance C between the capacitors 208 in the neighboring resonance circuits 210 among the plurality of resonance circuits 210 be set such that the resonance frequencies f between the neighboring resonance circuits 210 among the plurality of resonance circuits 210 maintain the difference of two times or more.

Figure 10:
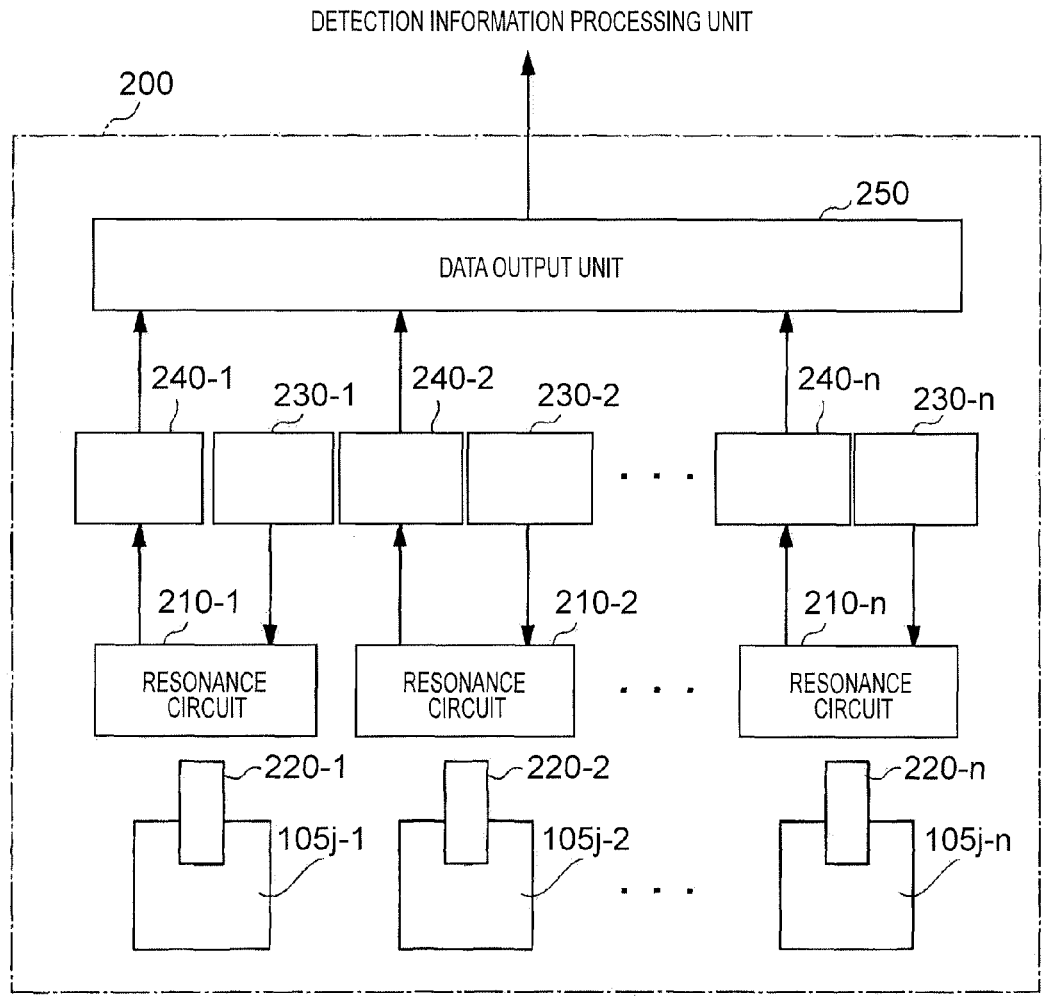
FIG. 10 is a block diagram of the thickness detecting unit 200 according to the embodiment.
Figure 10:
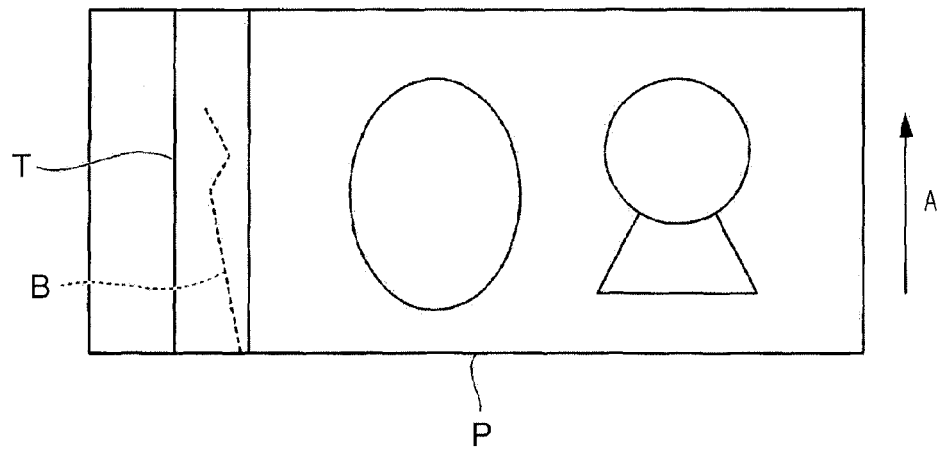

The functional configuration and the operation of the thickness detecting unit 200 according to the embodiment will be described below. FIG. 10 is a block diagram of the thickness detecting unit 200 according to the embodiment. The thickness detecting unit 200 includes a plurality of resonance circuits 210-1 to 210-$n$, a plurality of displacement members 220-1 to 220-$n$, a plurality of oscillation units 230-1 to 230-$n$, a plurality of calculation units 240-1 to 240-$n$, and a data output unit 250. n is an arbitrary natural number. In the following description, when the oscillation units 230-1 to 230-$n$ are not distinguished from each other, the oscillation units will be simply described to be "oscillation units 230." When the calculation units 240-1 to 240-$n$ are not distinguished from each other, the calculation units will be simply described to be "calculation units 240."

As described above, each resonance circuit 210 includes a first coil layer 204, a second coil layer 206, and a capacitor 208. The oscillation units 230 are disposed to correspond to the plurality of resonance circuits 210. The oscillation units 230 cause the resonance circuits 210 to resonate by supplying drive power to the resonance circuits 210. The oscillation units 230 cause the resonance circuits 210 to resonate, and it is possible to further decrease the impedance of the resonance circuits 210 and thus to reduce power consumption.

When a resonating current flows in the first coil 204a and the second coil 206a, a magnetic field is generated. The generated magnetic field reaches the corresponding displacement member 220. By this magnetic field, an induced electromotive force is generated in the displacement member 220 and an eddy current flows therein. The power supplied from the oscillation unit 230 is consumed by the parasitic resistance of the displacement member 220 in which the eddy current flows and the parasitic resistance of the first coil 204a and the second coil 206a.

The calculation units 240 are achieved, for example, by causing a processor such as a CPU to execute a program stored in a program memory. A part or all of the functional units may be achieved by hardware such as a large scale integration (LSI), an application specific integrated circuit (ASIC), or a field-programmable gate array (FPGA). The calculation units 240 perform a calculation process of detecting the thickness of the paper sheet P based on the impedance of the resonance circuits 210 and the displacement members 220 varying depending on the power supplied from the oscillation units 230 to the resonance circuits 210. The thickness detecting unit 200 according to the embodiment includes a plurality of calculation units 240, but the embodiment is not limited to this configuration and the calculation process may be performed for the plurality of resonance circuits 210 using a single calculation unit 240.

As illustrated in FIG. 10, when a reinforcing material T is pasted on a torn part B of a paper sheet P, the displacement in the Z-axis direction of the conveyance roller 105$j$-1 at the position facing the reinforcing material T is different from the displacement in the Z-axis direction of the other conveyance rollers 105$j$-2 to 105$j$-$n$. Accordingly, the thickness of the paper sheet P calculated by the calculation unit 240-1 is different from the thicknesses of the paper sheet P calculated by the calculation units 240-2 to 240-$n$.

The data output unit 250 transmits a plurality of thickness detection signals indicating the thicknesses of the paper sheet P calculated by the plurality of calculation units 240 to the detection information processing unit 170 of the determination processing unit 100 described above with reference to FIGS. 2 and 3. The detection information processing unit 170 transmits the plurality of thickness detection signals transmitted from the thickness detecting unit 200 to the CPU 21 of the main controller 20. The CPU 21 detects abnormality of the thickness of the paper sheet P based on the plurality of thickness detection signals received from the determination processing unit 100.

The CPU 21 can specify a part in which abnormality of the thickness is generated in the paper sheet P based on the plurality of thickness detection signals. Then, when the abnormality of the thickness of the paper sheet P is detected, the CPU 21 controls the paper sheet processing apparatus 1 so as to sort and accumulate the paper sheet P in the rejection unit 18a or 18b described above with reference to FIG. 1. Accordingly, the paper sheet processing apparatus 1 can distinguish a normal paper sheet P and an abnormal paper sheet P from each other. More specifically, the thickness detecting unit 200 can detect the thicknesses at twelve positions of the paper sheet P, for example, by including twelve resonance circuits 210 in the direction crossing the conveying direction A of the paper sheet P. As a result, according to the thickness detecting unit 200, the detection information processing unit 170 can determine whether a thin reinforcing material T such as a tape is pasted thereon.

Figure 11:
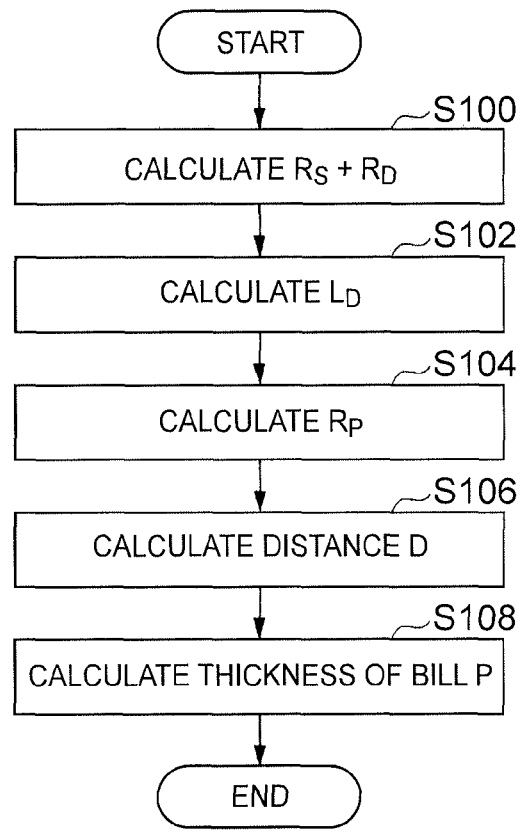
FIG. 11 is a flowchart illustrating a process of detecting a thickness of a paper sheet P, which is performed by a plurality of calculation units 240 according to the embodiment.

FIG. 11 is a flowchart illustrating the process of detecting a thickness of a paper sheet P, which is performed by the plurality of calculation units 240 according to the embodiment. First, each calculation unit 240 calculates the sum of the parasitic resistance value Rs of the first coil 204a and the second coil 206a and the parasitic resistance value RD of the displacement member 220 in which an eddy current flows. Specifically, the calculation unit 240 detects a current I flowing in the resonance circuit 210 and calculates Rs+RD based on the power P supplied from the oscillation unit 230 to the resonance circuit 210 and the current I flowing in the resonance circuit 210 (step S100). Here, Rs+RD=P/I² is established.

Then, the calculation unit 240 calculates the mutual inductance LD of the eddy current flowing in the displacement member 220 based on the following Expression (5) (step S102). Here, C denotes the capacitance of the capacitor 208 and f denotes the resonance frequency of the resonance circuit 210. Lr denotes the inductance value (reference inductance value) measured when the displacement member 220 and the second coil 206a are separated from each other by a predetermined reference distance. The resonance frequency f is a value set for each resonance circuit 210 in advance.

[Math. 5]

$$L_D = \frac{1}{C(2\pi f)^2} - L_r \qquad \text{Expression (5)}$$

Then, the calculation unit 240 calculates the impedance (parallel resonance-point impedance) Rp of the resonance circuit 210 and the displacement member 220 in which the eddy current flows in a state in which the resonance circuit 210 is made to resonate by the oscillation unit 230. The total inductance Ltotal of the first coil 204a and the second coil 206a is a known value which is calculated by Expressions (2) and (3) described above. The capacitance C of the capacitor 208 is also a known value. Accordingly, the calculation unit 240 calculates the parallel resonance-point impedance Rp based on the following Expression (6) (step S104).

[Math. 6]

$$R_p = \frac{L_{total} + L_D}{(R_s + R_D) \times C} \qquad \text{Expression (6)}$$

Then, the calculation unit 240 calculates the distance D between the second coil layer 206 and the displacement member 220 based on the parallel resonance-point impedance Rp calculated in step S104 (step S106). For example, the calculation unit 240 calculates the distance D using a function, a table, a map, or the like indicating a relationship between the parallel resonance-point impedance Rp and the distance D.

Then, the calculation unit 240 calculates the thickness of the paper sheet P based on the distance D calculated in step S106 (step S108). For example, the calculation unit 240 calculates the thickness of the paper sheet P using a function, a table, a map, or the like indicating the relationship between the distance D and the thickness of the paper sheet P.

In this embodiment, the calculation unit 240 calculates the distance D based on the parallel resonance-point impedance Rp and calculates the thickness of the paper sheet P based on the distance D. However, the calculation unit 240 may calculate the thickness of the paper sheet P directly from the parallel resonance-point impedance Rp without calculating the distance D.

Figure 12:
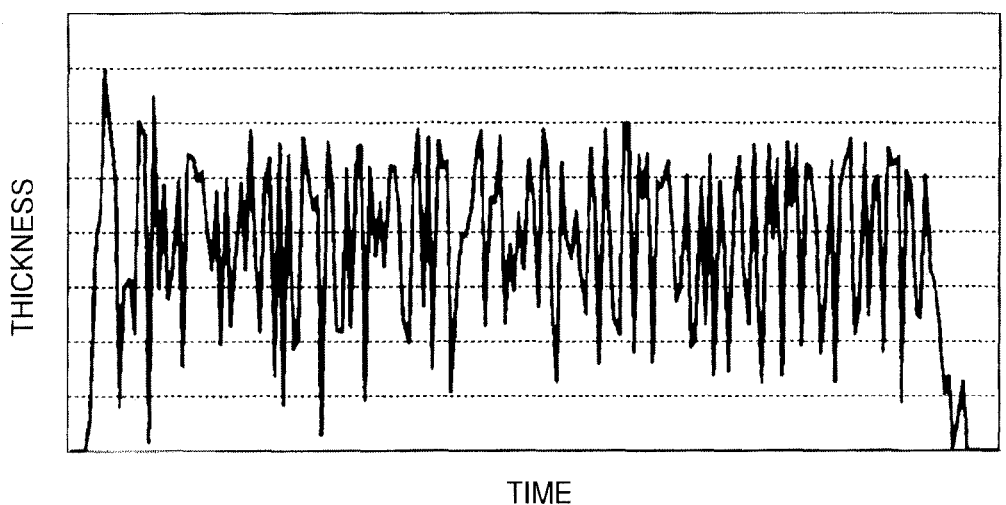
FIG. 12 is a diagram illustrating a thickness detection result of a paper sheet P in a thickness detecting unit according to a comparative example.
Figure 13:
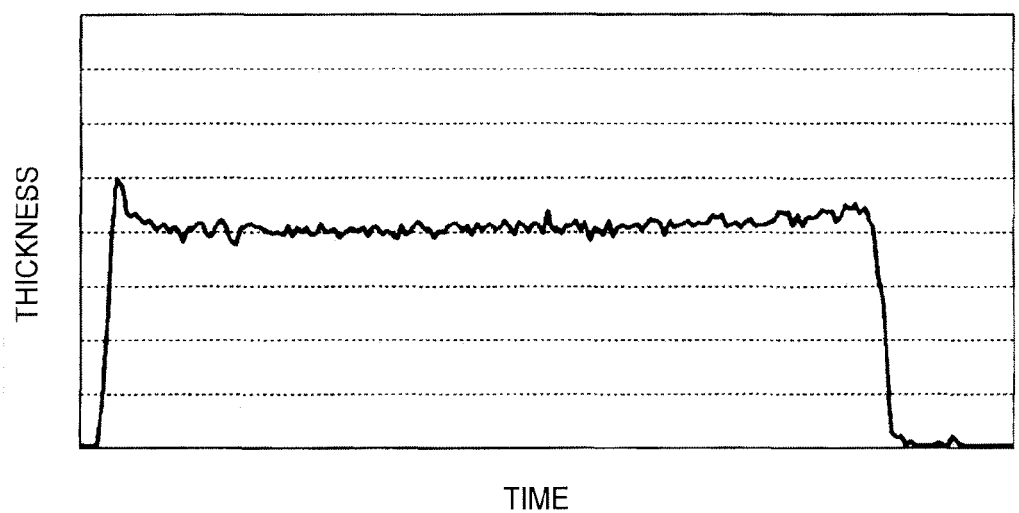
FIG. 13 is a diagram illustrating an example of a thickness detection result of a paper sheet P according to the embodiment.

As described above, in the thickness detecting unit 200 according to the embodiment, since the resonance frequencies f between the neighboring resonance circuits 210 among the plurality of resonance circuits 210 are set to be different from each other, it is possible to suppress interference between the resonance circuits 210 and thus to enhance thickness detection accuracy. FIG. 12 is a diagram illustrating a thickness detection result of a paper sheet P in a thickness detecting unit according to a comparative example. FIG. 13 is a diagram illustrating an example of the thickness detection result of a paper sheet P. The thickness detection result illustrated in FIG. 13 is a thickness detection result when one resonance circuit 210 of the neighboring resonance circuits 210 among the plurality of resonance circuits 210 operates in the thickness detecting unit 200 of the embodiment. In the thickness detecting unit according to the comparative example, the plurality of resonance circuits 210 are arranged such that the distance Dx between the neighboring resonance circuits 210 is equal to or less than 15 mm and the resonance circuits operate at the same resonance frequency f. In the thickness detecting unit according to the comparative example, as illustrated in FIG. 12, it can be seen that noise in the thickness detection result is large due to interference between the neighboring resonance circuits 210 among the plurality of resonance circuits 210 by a pull-in phenomenon or a coupling phenomenon.

Configuration examples of the embodiment will be described below.

A configuration example of the embodiment further includes a plurality of conveyance rollers 105 that convey a paper sheet P, which are displaced depending on the thickness of the paper sheet P, and are arranged in the direction crossing the conveying direction of the paper sheet P, and the plurality of displacement members 220 come in contact with the side opposite to the side of the plurality of conveyance rollers 105 coming in contact with the paper sheet P and are displaced with the displacements of the plurality of conveyance rollers 105.

In another configuration example of the embodiment, the resonance circuits 210, the oscillation units 230, the displacement members 220, the calculation units 240, and the conveyance rollers 105 are disposed at a plurality of positions in the direction crossing the conveying direction A of the paper sheet P.

In another configuration example of the embodiment, the calculation unit 240 calculates the total sum of the parasitic resistance values of the first coil 204 and the second coil 206 and the parasitic resistance value of the corresponding displacement member 220 based on the current flowing in the corresponding resonance circuit 210 and power supplied to the resonance circuit 210 from the corresponding oscillation unit 230, and calculates the mutual inductance value of the eddy current flowing in the corresponding displacement member 220 based on the capacitance value of the capacitor 208, the resonance frequency f of the corresponding resonance circuit 210, and the inductance value measured when the displacement member 220 and the second coil 206 are separated from each other by a predetermined reference distance, and calculates the impedance values of the resonance circuit 210 and the displacement member 220 based on the total inductance value of the first coil 204 and the second coil 206, the mutual inductance value, the total sum, and the capacitance value of the capacitor 208, and calculates the thickness of the paper sheet P.

Another configuration example of the embodiment is
a paper sheet processing apparatus 1 that includes
the thickness detecting unit 200 according to the above-mentioned embodiment and
the determination processing unit 100 that determines abnormality of a paper sheet P based on the thicknesses of the plurality of paper sheets P in the direction crossing the conveying direction A of the paper sheet P which are calculated by the calculation unit of the thickness detecting device 200.

According to at least one of the above-mentioned embodiments, the thickness detecting device includes a plurality of displacement members 220, a plurality of resonance circuits 210 that each include a first coil layer 204, a second coil layer 206, and a capacitor 208 and are arranged in the direction crossing the conveying direction A of a paper sheet P, a plurality of oscillation units 230 that supply power to the resonance circuits 210 and cause the resonance circuits 210 to resonate at resonance frequencies, and a calculation unit 240 that calculates a thickness of a paper sheet P at a plurality of positions in the direction crossing the conveying direction A of the paper sheet P based on the impedance of the plurality of resonance circuits 210 and the plurality of displacement members 220 in a state in which the plurality of resonance circuits 210 resonate, and the neighboring resonance circuits 210 among the plurality of resonance circuits 210 resonate at the resonance frequencies f which are set with a difference larger than the variation width in the resonance frequency varying depending on the distance between the displacement member 220 and the second coil layer 206. Accordingly, it is possible to enhance thickness detection accuracy of a paper sheet P by suppressing interference between the neighboring resonance circuits 210 among the plurality of resonance circuits 210.

According to the embodiment, the abnormality of a paper sheet P is determined based on the thicknesses of the plurality of paper sheet P in the direction crossing the conveying direction A of the paper sheet P, which are calculated by the calculation unit 240 of the thickness detecting unit 200. Accordingly, for example, even when a reinforcing material T is pasted on a torn part B of the paper sheet P, it is possible to obtain the thickness detection result corresponding to the position or width of the reinforcing material T and thus to determine that abnormality of the paper sheet P results from the pasting of the reinforcing material T.

As described above, an embodiment provides a sheet processing apparatus described below.

A sheet processing apparatus, comprising a thickness detecting device, the thickness detecting device including:

a plurality of conductive displacement members;

a plurality of resonance circuits that are disposed to correspond to the plurality of displacement members, each include a coil facing the corresponding displacement member and a capacitor, and neighboring resonance circuits resonate at different resonance frequencies; and a calculator that calculates a thickness of the sheet based on impedance values of the plurality of resonance circuits and the plurality of displacement members.

The embodiment may have one or more of the following features.

The neighboring resonance circuits are made to resonate at resonance frequencies which are set with a difference larger than a variation width in resonance frequency which varies depending on a distance between the displacement member and the coil, for example, a distance between the displacement member and the second coil.

The capacitance values of the capacitors of the neighboring resonance circuits among the plurality of resonance circuits are set to increase a difference in resonance frequency.

The capacitance values of the capacitors of the neighboring resonance circuits among the plurality of resonance circuits are set to be different.

The capacitance values of the capacitors of the neighboring resonance circuits among the plurality of resonance circuits are set to a difference of 1.5 times or more.

The capacitance values of the capacitors of the neighboring resonance circuits among the plurality of resonance circuits are set based on a variation width in mutual inductance of eddy currents flowing in the displacement members.

The apparatus further comprising a planar board in which a first coil is formed in a planar coil pattern on a first surface thereof, a second coil is formed in a planar coil pattern on an opposite surface of the first surface, and a plurality of the first coils and a plurality of the second coils are arranged in the direction crossing the conveying direction of the sheet.

The apparatus further comprising a plurality of conveyance rollers that convey the sheet, are displaced depending on the thickness of the sheet, and are arranged in the direction crossing the conveying direction of the sheet, wherein the plurality of displacement members come in contact with the plurality of conveyance rollers at a side opposite to the side of the sheet, and the plurality of displacement members are displaced in accordance with the displacements of the plurality of conveyance rollers.

The resonance circuits, the displacement members, and the conveyance rollers are disposed at a plurality of positions in the direction crossing the conveying direction of the sheet.

The calculator calculates a total sum of parasitic resistance values of the first coil and the second coil and a parasitic resistance value of the corresponding displacement member, calculates a mutual inductance value of the eddy current flowing in the corresponding displacement member, calculates parallel resonance-point impedance, and calculates the thickness of the sheet.

The apparatus further comprising a determination device that determines abnormality of the sheet based on the thicknesses at a plurality of positions of the sheet in the direction crossing the conveying direction of the sheet.

The plurality of conductive displacement members are displaced depending on a thickness of a sheet to be conveyed and are arranged in a direction crossing a conveying direction of the sheet.

The plurality of resonance circuits are disposed to correspond to the plurality of displacement members, each include a first coil facing the corresponding displacement member, a second coil connected in series to the first coil, having an axial direction parallel to the first coil, and facing the corresponding displacement member, and a capacitor connected in parallel to the first coil and the second coil, and the plurality of resonance circuits are arranged in a direction crossing the conveying direction of the sheet.

The apparatus further comprising a plurality of oscillator that are disposed to the plurality of resonance circuits.

As to the material of the sheet, other than a paper, resin, cloth or the like may be used.

The embodiment provides a method of detecting a thickness of a sheet.

A method of detecting a thickness of a sheet, using a thickness detecting device, the thickness detecting device including:

a plurality of conductive displacement members; and a plurality of resonance circuits that are disposed to correspond to the plurality of displacement members, each include a coil facing the corresponding displacement member and a capacitor;

wherein resonating neighboring resonance circuits at different resonance frequencies; and calculating a thickness of the sheet based on impedance values of the plurality of resonance circuits and the plurality of displacement members.

The method may have one or more of the following features.

The neighboring resonance circuits are made to resonate at resonance frequencies which are set with a difference larger than a variation width in resonance frequency which varies depending on a distance between the displacement member and the coil.

The capacitance values of the capacitors of the neighboring resonance circuits among the plurality of resonance circuits are set to increase a difference in resonance frequency.

The capacitance values of the capacitors of the neighboring resonance circuits among the plurality of resonance circuits are set to be different.

The capacitance values of the capacitors of the neighboring resonance circuits among the plurality of resonance circuits are set to a difference of 1.5 times or more.

The capacitance values of the capacitors of the neighboring resonance circuits among the plurality of resonance circuits are set based on a variation width in mutual inductance of eddy currents flowing in the displacement members.

The method includes, calculating a total sum of parasitic resistance values of the first coil and the second coil and a parasitic resistance value of the corresponding displacement member, calculating a mutual inductance value of the eddy current flowing in the corresponding displacement member, calculating parallel resonance-point impedance, and calculating the thickness of the sheet.

The abnormality of the sheet is determined based on the thicknesses at a plurality of positions of the sheet in the direction crossing the conveying direction of the sheet.

While certain embodiments have been described, these embodiments have been presented by way of example only, and are not intended to limit the scope of the inventions. Indeed, the novel embodiments described herein may be embodied in a variety of other forms; furthermore, various omissions substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet processing apparatus, comprising a thickness detecting device, the thickness detecting device including:
    a plurality of conductive displacement members;
    a plurality of resonance circuits that are disposed to correspond to the plurality of displacement members, each include a coil facing the corresponding displacement member and a capacitor, and neighboring resonance circuits resonate at different resonance frequencies; and
    a calculator that calculates a thickness of the sheet based on impedance values of the plurality of resonance circuits and the plurality of displacement members
    wherein capacitance values of the capacitors of the neighboring resonance circuits among the plurality of resonance circuits are set to increase a difference in resonance frequency.

2. The sheet processing apparatus according to claim 1, wherein the neighboring resonance circuits are made to resonate at resonance frequencies which are set with a difference larger than a variation width in resonance frequency which varies depending on a distance between the displacement member and the coil.

3. The sheet processing apparatus according to claim 1, wherein capacitance values of the capacitors of the neighboring resonance circuits among the plurality of resonance circuits are set based on a variation width in mutual inductance of eddy currents flowing in the displacement members.

4. The sheet processing apparatus according to claim 1, further comprising a determination device that determines abnormality of the sheet based on the thicknesses at a plurality of positions of the sheet in the direction crossing the conveying direction of the sheet.

5. The sheet processing apparatus according to claim 1, further comprising:
    a plurality of oscillators that are disposed to correspond to the plurality of resonance circuits.

6. A sheet processing apparatus, comprising a thickness detecting device, the thickness detecting device including:
    a plurality of conductive displacement members;
    a plurality of resonance circuits that are disposed to correspond to the plurality of displacement members, each include a coil facing the corresponding displacement member and a capacitor, and neighboring resonance circuits resonate at different resonance frequencies; and
    a calculator that calculates a thickness of the sheet based on impedance values of the plurality of resonance circuits and the plurality of displacement members;
    wherein capacitance values of the capacitors of the neighboring resonance circuits among the plurality of resonance circuits are set to a difference of 1.5 times or more.

7. A sheet processing apparatus, comprising a thickness detecting device, the thickness detecting device including:
    a plurality of conductive displacement members;
    a plurality of resonance circuits that are disposed to correspond to the plurality of displacement members, each include a coil facing the corresponding displacement member and a capacitor, and neighboring resonance circuits resonate at different resonance frequencies;
    a calculator that calculates a thickness of the sheet based on impedance values of the plurality of resonance circuits and the plurality of displacement members; and
    a planar board in which a first coil is formed in a planar coil pattern on a first surface thereof, a second coil is formed in a planar coil pattern on an opposite surface of the first surface, and a plurality of the first coils and a plurality of the second coils are arranged in the direction crossing the conveying direction of the sheet.

8. The sheet processing apparatus according to claim 7, wherein the calculator calculates a total sum of parasitic resistance values of the first coil and the second coil and a parasitic resistance value of the corresponding displacement member, calculates a mutual inductance value of the eddy current flowing in the corresponding displacement member, calculates parallel resonance-point impedance, and calculates the thickness of the sheet.

9. A sheet processing apparatus, comprising a thickness detecting device, the thickness detecting device including:
    a plurality of conductive displacement members;
    a plurality of resonance circuits that are disposed to correspond to the plurality of displacement members, each include a coil facing the corresponding displacement member and a capacitor, and neighboring resonance circuits resonate at different resonance frequencies;

a calculator that calculates a thickness of the sheet based on impedance values of the plurality of resonance circuits and the plurality of displacement members; and a plurality of conveyance rollers that convey the sheet, are displaced depending on the thickness of the sheet, and are arranged in the direction crossing the conveying direction of the sheet, wherein the plurality of displacement members come in contact with the plurality of conveyance rollers at a side opposite to the side of the sheet, and the plurality of displacement members are displaced in accordance with the displacements of the plurality of conveyance rollers.

10. The sheet processing apparatus according to claim 9, wherein the resonance circuits, the displacement members, and the conveyance rollers are disposed at a plurality of positions in the direction crossing the conveying direction of the sheet.

11. A sheet processing apparatus, comprising a thickness detecting device, the thickness detecting device including:

a plurality of conductive displacement members;

a plurality of resonance circuits that are disposed to correspond to the plurality of displacement members, each include a coil facing the corresponding displacement member and a capacitor, and neighboring resonance circuits resonate at different resonance frequencies; and a calculator that calculates a thickness of the sheet based on impedance values of the plurality of resonance circuits and the plurality of displacement members;

wherein the plurality of conductive displacement members are displaced depending on a thickness of a sheet to be conveyed and are arranged in a direction crossing a conveying direction of the sheet;

the plurality of resonance circuits are disposed to correspond to the plurality of displacement members, each include a first coil facing the corresponding displacement member, a second coil connected in series to the first coil, having an axial direction parallel to the first coil, and facing the corresponding displacement member, and a capacitor connected in parallel to the first coil and the second coil, and the plurality of resonance circuits are arranged in a direction crossing the conveying direction of the sheet.

12. A method of detecting a thickness of a sheet, using a thickness detecting device, the thickness detecting device including:

a plurality of conductive displacement members; and a plurality of resonance circuits that are disposed to correspond to the plurality of displacement members, each include a coil facing the corresponding displacement member and a capacitor;

wherein resonating neighboring resonance circuits at different resonance frequencies; and calculating a thickness of the sheet based on impedance values of the plurality of resonance circuits and the plurality of displacement members;

wherein capacitance values of the capacitors of the neighboring resonance circuits among the plurality of resonance circuits are set to increase a difference in resonance frequency.

13. The method of detecting a thickness of a sheet according to claim 12, wherein the neighboring resonance circuits are made to resonate at resonance frequencies which are set with a difference larger than a variation width in resonance frequency which varies depending on a distance between the displacement member and the coil.

14. The method of detecting a thickness of a sheet according to claim 12, wherein capacitance values of the capacitors of the neighboring resonance circuits among the plurality of resonance circuits are set to a difference of 1.5 times or more.

15. The method of detecting a thickness of a sheet according to claim 12, wherein capacitance values of the capacitors of the neighboring resonance circuits among the plurality of resonance circuits are set based on a variation width in mutual inductance of eddy currents flowing in the displacement members.

16. The method of detecting a thickness of a sheet according to claim 12, wherein abnormality of the sheet is determined based on the thicknesses at a plurality of positions of the sheet in the direction crossing the conveying direction of the sheet.

* * * * *